US011209655B2

(12) United States Patent
Amati et al.

(10) Patent No.: US 11,209,655 B2
(45) Date of Patent: *Dec. 28, 2021

(54) SYSTEM AND METHOD FOR CORRECTING A ROLLING DISPLAY EFFECT

(71) Applicant: ELBIT SYSTEMS LTD., Haifa (IL)

(72) Inventors: Johai Amati, Haifa (IL); Vadim Neimark, Haifa (IL); Sharon Kedem, Haifa (IL)

(73) Assignee: ELBIT SYSTEMS LTD.

( * ) Notice: Subject to any disclaimer, the term of this patent is extended or adjusted under 35 U.S.C. 154(b) by 0 days.

This patent is subject to a terminal disclaimer.

(21) Appl. No.: 17/019,414

(22) Filed: Sep. 14, 2020

(65) Prior Publication Data

US 2020/0409158 A1 Dec. 31, 2020

Related U.S. Application Data

(63) Continuation of application No. 16/629,039, filed as application No. PCT/IL2018/050741 on Jul. 8, 2018, now Pat. No. 10,775,629.

(30) Foreign Application Priority Data

Jul. 11, 2017 (IL) ........................................ 253432
Jun. 13, 2018 (IL) ........................................ 260023

(51) Int. Cl.
*G02B 23/12* (2006.01)
*G02B 27/01* (2006.01)
*G06T 15/10* (2011.01)

(52) U.S. Cl.
CPC ....... *G02B 27/0172* (2013.01); *G02B 23/125* (2013.01); *G02B 27/0189* (2013.01); *G06T 15/10* (2013.01); *G02B 2027/0141* (2013.01); *G02B 2027/0187* (2013.01)

(58) Field of Classification Search
CPC ............... G06T 15/10; G02B 27/0189; G02B 27/0172; G02B 23/125; G02B 2027/0141; G02B 2027/014; G02B 2027/0187; G06F 3/012; G06F 3/011
See application file for complete search history.

(56) References Cited

U.S. PATENT DOCUMENTS

| | | |
|---|---|---|
| 5,933,125 A | 8/1999 | Fernie et al. |
| 9,443,355 B2 | 9/2016 | Chan et al. |
| 9,595,083 B1 | 3/2017 | Smith et al. |
| 2012/0268490 A1* | 10/2012 | Sugden .................. G09G 3/003 345/633 |
| 2014/0375680 A1 | 12/2014 | Ackerman et al. |
| 2015/0235583 A1 | 8/2015 | SchoWengerdt et al. |
| 2016/0026253 A1 | 1/2016 | Bradski et al. |
| 2016/0189429 A1 | 6/2016 | Mallinson |
| 2017/0018121 A1 | 1/2017 | Lawson et al. |
| 2017/0053450 A1 | 2/2017 | Rodriguez et al. |
| 2017/0123215 A1 | 5/2017 | Li et al. |
| 2017/0148206 A1 | 5/2017 | Donner |

FOREIGN PATENT DOCUMENTS

| | | |
|---|---|---|
| WO | 2016076951 | 5/2016 |
| WO | 2016164207 | 10/2016 |
| WO | 2017064469 | 4/2017 |

\* cited by examiner

*Primary Examiner* — Towfiq Elahi

(57) ABSTRACT

A system for displaying, on a see-through display located within a moving platform, a frame, while at least partially correcting a rolling display effect.

20 Claims, 5 Drawing Sheets

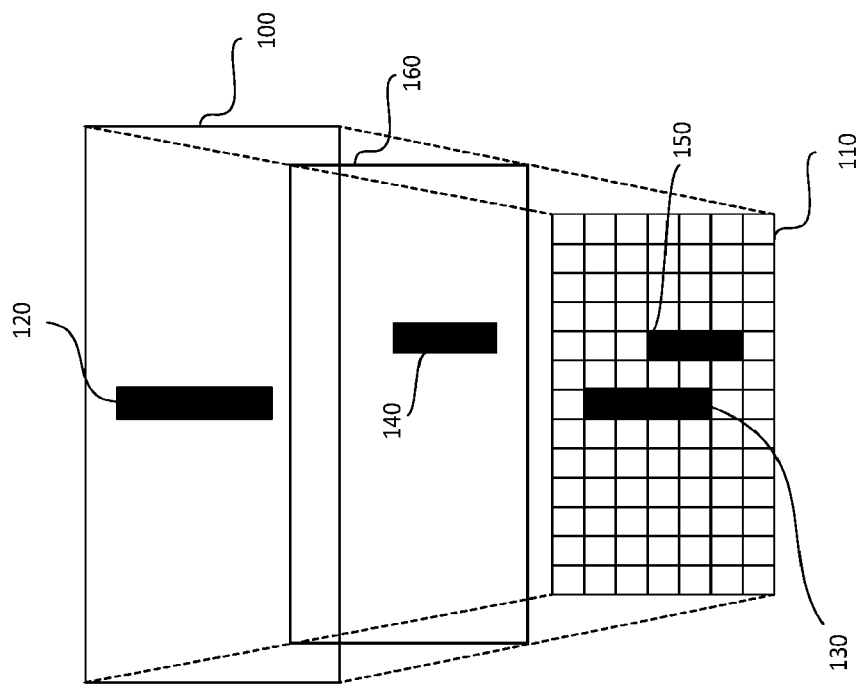
Fig. 1A – Prior art

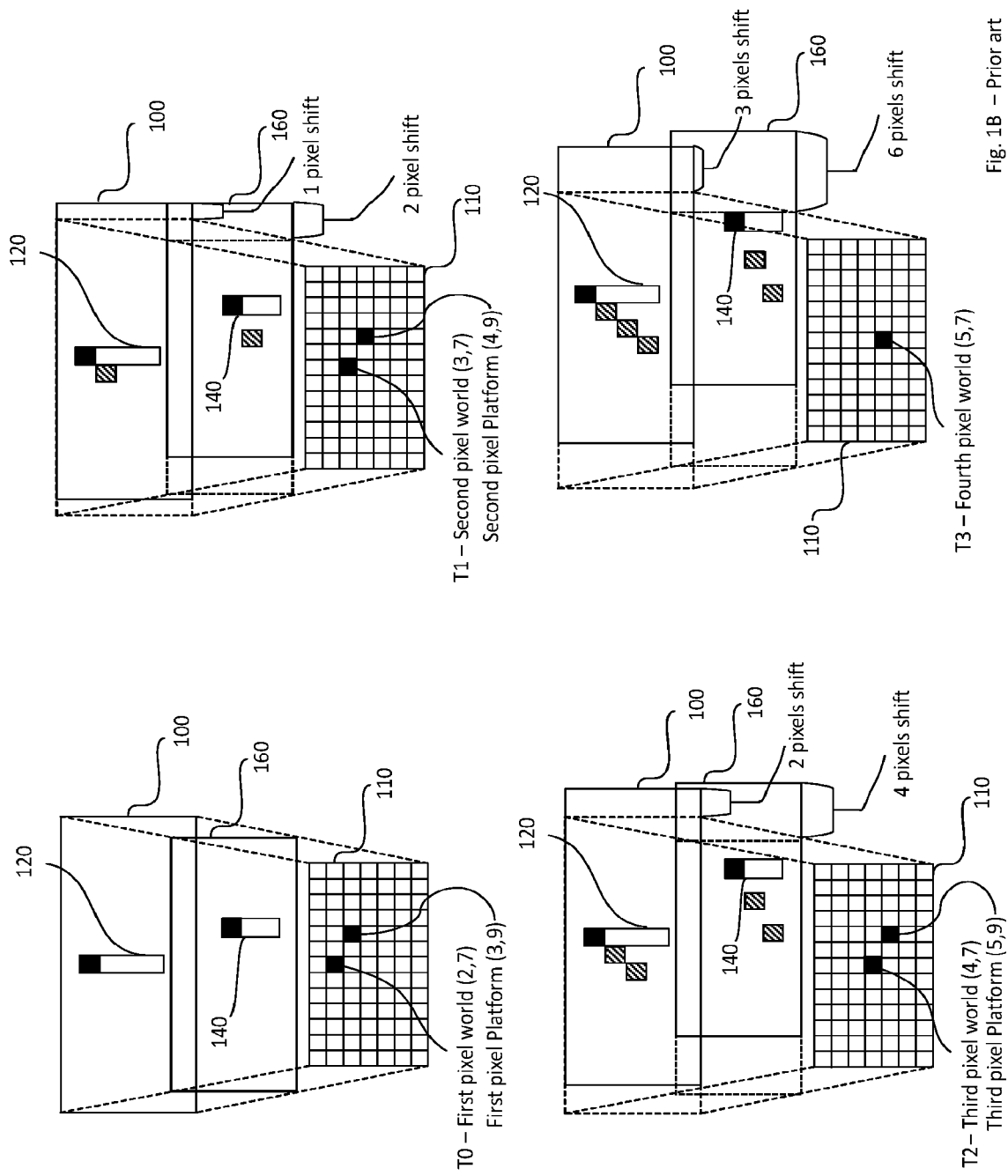

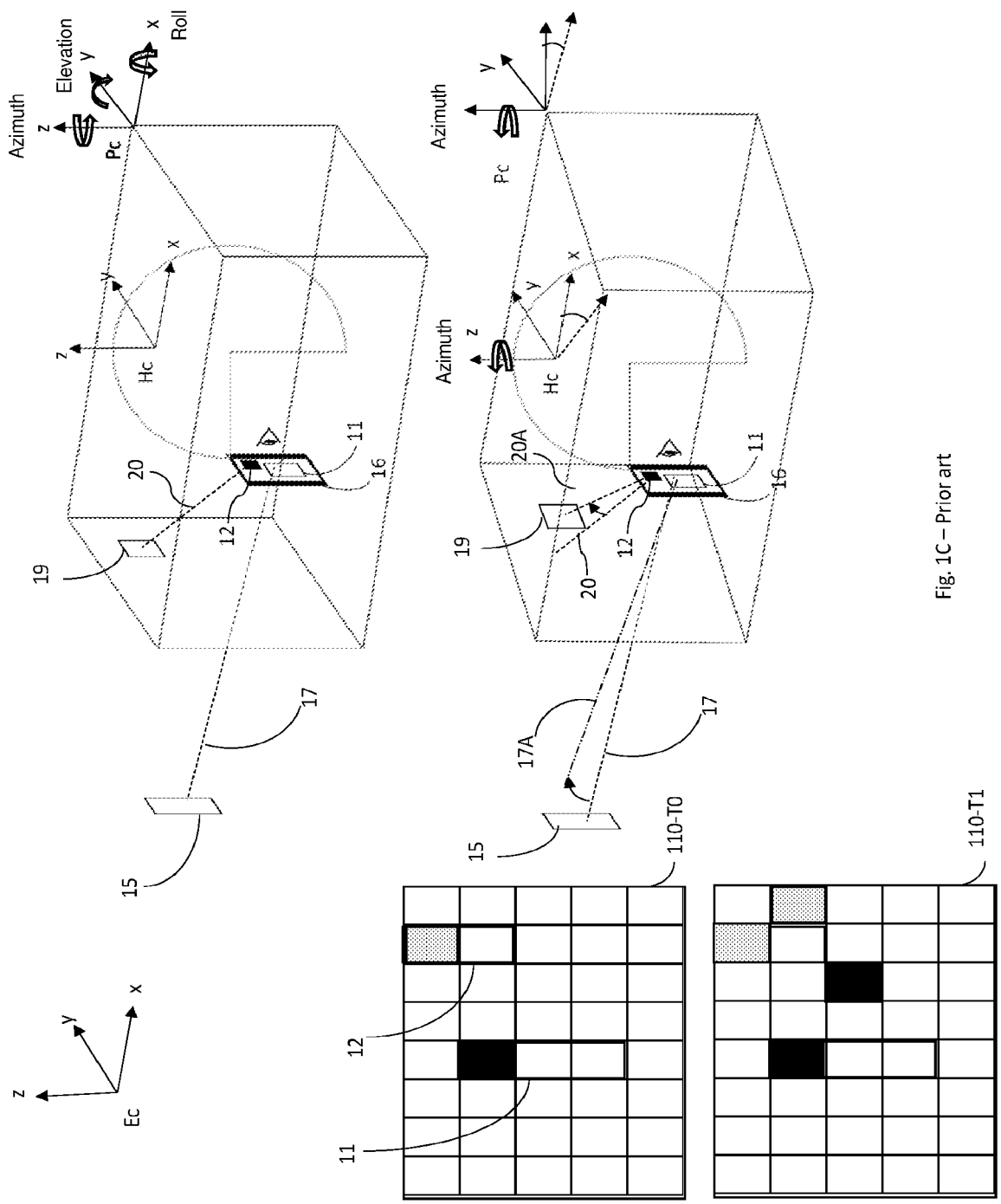
Fig. 1C – Prior art

SYSTEM AND METHOD FOR CORRECTING A ROLLING DISPLAY EFFECT

TECHNICAL FIELD

The invention relates to a system and method for correcting a rolling display effect.

BACKGROUND

The Vestibulo Ocular Reflex (herein abbreviated VOR) is a reflex, of the human eye whereby head movement causes movement of the eyes in an opposite direction (i.e., to that of the head). As the head moves, the semicircular canals in the ears, which are spatially located in three perpendicular planes, send signals to the brain indicative of the velocity and acceleration of the head in all directions. The brain then sends signals to the muscles of the eye to move in an opposite direction to the direction of head movement. The VOR results in a stabilized image on the retina of the eye as the head moves and allows the eyes to stay aligned and focused on an object even as the head moves.

Some display systems use pixel projection mechanisms for projecting frames comprised of a plurality of pixels on a reflective or semi reflective surface designed to reflect the pixels into the eyes of a user viewing the surface, where not all pixels are projected on the surface simultaneously. The pixels in such display systems can be projected pixel-by-pixel, pixel-row by pixel-row, or in any other manner, in which for at least a given pair of pixels, there is a time difference between projecting the first pixel of the pair and the second pixel of the pair on the surface.

In some cases, the surface on which such display systems project the frames is a see-through display, being a transparent surface, such as a visor of a helmet (or any other head worn system) worn by a user (e.g. a pilot of an aircraft or any other operator of a stationary or moving platform), treated with a semi-reflective treatment making visor a combiner, as is known in the art.

In those cases, where pixel projection mechanisms projects pixels (forming a frame) in a non-simultaneous manner on a see-through display reflecting the pixels onto the eyes of the user, due to the VOR, objects projected by the pixel projection mechanism can appear distorted if the pose of the see-through display on which such objects are projected changes over time during projection of the pixels comprising the objects (while the pixel projection mechanism and the see-through display on which it projects maintain a fixed spatial relationship).

In addition, in some cases, adding to the complexity, it is desirable to display a plurality of elements (e.g. images, videos, text, symbols, or any other type of data that can be displayed on the see-through display) on the see-through display, in such a manner that at least a first element is displayed relative to a first coordinate system while at least a second element is displayed relative to a second coordinate system, other than the first coordinate system. It is to be noted that although reference is made herein to at least two elements, each displayed relative to a corresponding coordinate system, in some cases more than two elements can be displayed relative to more than two corresponding coordinate systems.

In order to ease the understanding of the phenomena, reference in some examples provided herein will be made to a scenario in which certain spatial relationship between two or more elements (comprised within a frame), projected by such display system on the see-through display, and two or more corresponding real-world objects, seen by the user through the see-through display, is required to be maintained. In the scenario, at least a first real-world-object is fixed to a first coordinate system (e.g. earth coordinate system), while at least a second real-world object is fixed to a second, coordinate system (e.g. a coordinate system of a moving platform). For example, a first element projected on the see-through display may be required to overlay the first real-world object (that is fixed to the first coordinate system) seen through the see-through display while a second element projected on the see-through display may be required to overlay the second real-world object (that is fixed to the second coordinate system) seen through the see-through display. It is to be noted that in other cases, the one or more of elements are not required to overlay the corresponding real-world objects, and instead they are required to be displayed at a certain other spatial relationship therewith (e.g. be parallel thereto). The spatial relationships discussed above is compromised when the pose of the see-through display changes while the pixels are still being projected (i.e. at any given time between projection of the first pixel and the last pixel of a given image on the see-through display).

It is to be noted however that the distortion of the objects projected by the pixel projection mechanism will occur irrespective of any relationship of such objects with real-word objects, in those cases where the pose of the see-through display on which such objects are projected changes over time during the projection thereof.

Attention is drawn in this respect to FIGS. 1A, 1B and 1C. FIG. 1A is an illustration of a desired display of a frame comprising two elements displayed relative to two different coordinate systems, each of the elements overlaying a corresponding real-world object (in the illustrated example—two corresponding vertical lines) seen through the see-through display, in accordance with the prior art. FIG. 1B is an illustration of the rolling display effect occurring upon a change of the see-through display's pose relative to a first coordinate system (e.g. Earth coordinate system (also referred to herein as "real-world coordinate system", interchangeably)) and, simultaneously, to a second coordinate system (e.g. a coordinate system of a moving platform (also referred to herein as "platform coordinate system", interchangeably) in which a user wearing the see-through display is located), while a given frame is being projected by the pixel projection mechanism, in accordance with the prior art. FIG. 1C is another illustration of the same rolling display effect, in accordance with the prior art.

Looking at FIG. 1A, a frame 100 is shown, representing the real-world, having real-world coordinate system. A first vertical line 120 is shown within frame 100, being an object within the real-world (e.g. a building). In addition, frame 160 is shown, representing a moving platform in which a user wearing the see-through display is located, the moving platform having its own coordinate system, other than the real-world, coordinate system. A second vertical line 140 is shown within frame 160, being an object within the moving platform (e.g. a slider Graphical User Interface (GUI) object shown on a display within the moving platform).

Two elements are projected on the see-through display 110, namely two vertical lines: a first projected vertical line 130 (comprised, in the illustrated example, of four vertical pixels) and a second projected vertical fine 150 (comprised, in the illustrated example, of three vertical pixels). The vertical lines, first projected vertical line 130 and second projected vertical line 150, are projected so that: (a) all pixels of the first projected vertical line 130 are perceived by the user viewing the see-through display as Vertical, and overlaying the first vertical line 120 within frame 100 representing the real-world, as desired, and (b) all pixels of the second projected vertical line 150 are perceived by the user viewing the see-through display as vertical, and overlaying the second vertical line 140 within the frame 160 representing the moving platform, as desired. However, in the example shown in FIG. 1A, the see-through display's 110 pose does not change during projection of the pixels.

In the illustration shown in FIG. 1B, the see-through display's 110 pose changes over time, as the see-through display 110 moves at a certain angular rate to the left-hand side (changes its spatial position). In addition to the movement of the see-through display 110, the moving platform performs a turn to the opposite side of the movement of the see-through display 110. In the example, the see-through display's 110 movement results in a shift of the see-through display 110, equivalent to one pixel to the left-hand side relative to earth coordinates, and two pixels shift to the left-hand side relative to the moving platform coordinates, during presentation of each pixel row.

More specifically, at T0, being the time the projector projected the first pixel of the first projected vertical line 130 and the first pixel of the second projected vertical line 150 on the see-through display 110 (i.e. the pixel located at the second row, seventh column (denoted in the illustration "first pixel world"), and the pixel projected at the third row, ninth column (denoted in the illustration "first pixel platform"), in the seven by thirteen matrix of pixels projectable by the projector), (a) the first pixel of the first projected vertical line 130 is aligned with the first vertical line 120 (being an object fixed to earth in the illustrated example), and (b) the first pixel of the second projected vertical line 150 is aligned with the second vertical line 140 (being an object fixed to the moving platform in the illustrated example).

However, at T1, being the time the projector projected the second pixel of the first projected vertical line 130 and the second pixel of the second projected vertical line 150 on the see-through display 110 (i.e. the pixel located at the third row, seventh column (denoted in the illustration "second pixel world"), and the pixel projected at the fourth row, ninth column (denoted in the illustration "second pixel platform"), in the seven by thirteen matrix of pixels projectable by the projector), (a) due to the change in the see-through display's 110 pose relative to earth coordinates, the second pixel of the first projected vertical line 130 is no longer aligned with the first vertical line 120, as it is shifted one pixel distance to the left-hand side with respect to the first vertical line 120, and (b) due to the change m the see-through display's 110 pose relative to the moving platform's coordinate system (a change that is, in the illustrated example, different than the change in the see-through display's 110 pose relative to earth coordinates), the second pixel of the second projected vertical line 150 is no longer aligned with the second vertical line 140, as it is shifted two pixels distance to the left-hand side with respect to the second vertical line 140.

At T2, being the time the projector projected the third pixel of the first projected vertical line 130 and, the third pixel of the second projected vertical line 150 on the see-through display 110 (i.e. the pixel located at the fourth row, seventh column (denoted in the illustration "third pixel world"), and the pixel projected at the fifth row, ninth column (denoted in the illustration "third pixel platform") in the seven by thirteen matrix of pixels projectable by the projector), (a) due to the change in the see-through display's 110 pose relative to earth coordinates, the third pixel of the first projected vertical line 130 is no longer aligned with the first vertical line 120, as it is shifted two pixels distance to the left-hand side with respect to the first, vertical line 120, and (b) due to the change in the see-through display's 110 pose relative to the moving platform's coordinate system, the third pixel of the second projected vertical line 150 is no longer aligned with the second vertical line 140, as it is shifted four pixels distance to the left-hand side with respect to the second vertical line 140.

At T3, being the time the projector projected the fourth pixel of the first projected vertical line 130 on the see-through display 110 (i.e. the pixel located at the fifth row, seventh column (denoted in the illustration "fourth pixel world") in the seven by thirteen matrix of pixels projectable by the projector), due to the change in the see-through display's 110 pose, the fourth pixel is no longer aligned with the first vertical line 120, as it is shifted three pixel distance to the left-hand side with respect to the first vertical line 120.

The pixel shifting effect illustrated in FIG. 1B is referred to herein as a rolling display effect, and it results in the projected vertical lines appearing diagonal instead of aligned with the first vertical line 120 and the second vertical line 140. It can be appreciated that due to the fact that the relative motion of the see-through display 110 with respect to earth coordinate system is different than the relative motion of the see-through display 110 with respect to moving platform coordinate system, the slopes of the first vertical line 120 and the second vertical line 140 are different.

It is to be noted that in the example illustrated in FIG. 1B, the see-through display's 110 pose changes at a fixed rate with respect to both earth coordinates and the moving platform's coordinates, however this is not necessarily so, as the rate can be increased or decreased during projection of the pixels of a given frame. The pose change rate also affects the pixel shifting distance, and the higher the pose change rate is relative to the respective coordinate system—the larger the pixel shifting distance is. It is to be further noted that the reference herein to the first vertical line 120 and to the second vertical line 140 is for illustration purposes only, and the rolling display affect is also problematic without referring to real-world objects. For example, an attempt to project any object (e.g. a vertical line), will result in the user, viewing the see-through display 110, perceiving the object in a distorted manner (e.g. a vertical line will appear to the user as diagonal). It is to be further noted that although only two elements are projected on the see-through display 110, in some cases more than two elements can be displayed, while it may be desirable that each will be fixed to a corresponding coordinate system. Furthermore, in some cases, more than two coordinate systems can exist (e.g. moving platform inside another moving platform and earth, etc.)

To further exemplify the rolling display effect problem, attention is drawn to FIG. 1C. In the illustrated example, the see-through display 110 is connected to a helmet worn by a person located within a moving platform (e.g. a pilot of an aircraft). An earth fixed object 15 within the real-world is also shown, fixed to earth coordinates (denoted Ec in the illustration), and a moving platform fixed object 19 is shown, fixed to the moving platform's coordinates (denoted Pc in the illustration). Two elements are projected on the see-through display 110, namely element 11 and element 12. Element 11 is designed to be overlaid on top of the earth fixed object 15, and element 12 is designed to be overlaid on top of the moving platform fixed object 19. Line 17 represents the line of sight of the person located within the moving platform with respect to the earth fixed object 15, and line 20 represents the line of sight of the person located within the moving platform with respect to the moving platform fixed object 19, at T0. T0 is the time the projector projected the first pixel of element 11 and element 12, as can be appreciated looking at the see-through display 110-T0. See-through display 110-T0 shows the projection of the first pixels of element 11 and element 12.

In the illustrated example, the person wearing the helmet rotates his head to the right-hand side, while the moving platform turns to the right hand side, so that at T1, the new line of sight of the person located within the moving platform with respect to the moving platform fixed object 19 (denoted 20A in the figure) is now at a degree α with respect to line 20, whereas the new line of sight of the person located within the moving platform with respect to the earth fixed object 15 (denoted 17A in the figure) is now at a degree 2α with respect to line 17. As a result, the second pixel of element 11 is shifted one pixel to the right, while the first pixel of element 12 is shifted two pixels to the right, as can be appreciated looking at the see-through display 110-T1. See-through display 110-T1 shows the projection of the second pixels of element 11 and element 12.

There is thus a need in the art for a new method and system for correcting a rolling display effect.

References considered to be relevant as background to the presently disclosed subject matter are listed below. Acknowledgement of the references herein is not to be inferred as meaning that these are in any way relevant to the patentability of the presently disclosed subject matter.

US Patent Application No. 2016/0189429 (Mallinson), published on Jun. 30, 2016, discloses methods, systems, and computer programs for the presentation of images in a Head-Mounted Display (HMD). One HMD includes a screen, a processor, inertial sensors, a motion tracker module, and a display adjuster module. The motion tracker tracks motion of the HMD based on inertial data from the inertial sensors, and the display adjuster produces modified display data for an image frame to be scanned to the screen if the motion of the HMD is greater than a threshold amount of motion. The display data includes pixel values to be scanned to rows in sequential order, and the modified display data includes adjusted pixel values for pixels in a current pixel row of the image frame to compensate for the distance traveled by the HMD during a time elapsed between scanning a first pixel row of the image frame and scanning the current pixel row of the image frame.

US Patent Application No. 2016/0035139 (Fuchs et al.) published on Feb. 4, 2016, discloses methods, systems, and computer readable media for low latency stabilization for head-worn displays are disclosed. According to one aspect, the subject matter described herein includes a system for low latency stabilization of a head-worn display. The system includes a low latency pose tracker having one or more rolling-shutter cameras that capture a 2D image by exposing each row of a frame at a later point in time than the previous row and that output image data row by row, and a tracking module for receiving image data row by row and using that data to generate a local appearance manifold. The generated manifold is used to track camera movements, which are used to produce a pose estimate.

U.S. Pat. No. 9,595,083 (Smith et al.) published on Mar. 14, 2017, discloses an apparatus for image displaying. The apparatus includes a prediction system and an imaging system. The prediction system is configured to predict, for a first time, a first position of a display device at a specific future time for displaying an image associated with a position of the display, and predict, for a second time that is later than the first time, a second position of the display at the future time with an offset to the first position. The imaging system is configured to render a first image associated with the first position, buffer the first image in a memory, and adjust the buffered first image according to the offset to generate a second image associated with the second position of the display device.

U.S. Pat. No. 5,933,125 (Fernie et al.) published on Aug. 3, 1999, discloses a method for reducing image instability in a virtual environment due to the transport delay of the image generator and other components of the system. A method is given for determining the error in the generated virtual environment and using this error for shifting the image on the display device thus providing a more accurate and more stable representation to the viewer.

U.S. Pat. No. 9,443,355 (Chan et al.) published on Sep. 13, 2016, discloses methods for generating and displaying images associated with one or more virtual objects within an augmented reality environment at a frame rate that is greater than a rendering frame rate are described. The rendering frame rate may correspond with the minimum time to render images associated with a pose of a head-mounted display device (HMD). In some embodiments, the HMD may determine a predicted pose associated with a future position and orientation of the HMD, generate a pre-rendered image based on the predicted pose, determine an updated pose associated with the HMD subsequent to generating the pre-rendered image, generate an updated image based on the updated pose and the pre-rendered image, and display the updated image on the HMD. The updated image may be generated via a homographic transformation and/or a pixel offset adjustment of the pre-rendered image by circuitry within the display.

PCT Patent Application No. WO/2016/164207 (Crisler et al.) published on Oct. 13, 2016, discloses a method to display video such as computer-rendered animation or other video. The method includes assembling a sequence of video frames featuring a moving object, each video frame including a plurality of subframes sequenced for display according to a schedule. The method also includes determining a vector-valued differential velocity of the moving object relative to a head of an observer of the video. At a time scheduled for display of a first subframe of a given frame, first-subframe image content transformed by a first transform is displayed. At a time scheduled for display of the second subframe of the given frame, second-subframe image content transformed by a second transform is displayed. The first and second transforms are computed based on the vector-valued differential velocity to mitigate artifacts.

US Patent Application No. 2015/0235583 (Schowengerdt et al.) published on Aug. 20, 2015, discloses a user display device comprising a housing frame mountable on the head of the user, a lens mountable on the housing frame and a projection sub system coupled to the housing frame to determine a location of appearance of a display object in a field of view of the user based at least in part on at least one of a detection of a head movement of the user and a prediction of a head movement of the user, and to project the display object to the user based on the determined location of appearance of the display object.

GENERAL DESCRIPTION

In accordance with a first aspect of the presently disclosed subject matter, there is provided a system for generating a frame for display on a see-through display, the frame comprising a plurality of pixels arranged in a plurality of pixel rows, wherein at least a first group of the pixels represents a first element displayed relative to a first coordinate system and a second group of the pixels represents a second element displayed relative to a second coordinate system other than the first coordinate system, wherein a time difference exists between a first time of displaying a reference pixel row of the pixel rows and a second time of displaying a given pixel row of the pixel rows, wherein the given pixel row is any pixel row of the pixel rows subsequent to the reference pixel row, and wherein a first pose of the see-through display at the first time is different than a second pose of said see-through display at the second time, thereby causing a rolling display effect, the system comprising a processor configured to: determine, using first information of the first pose and second information of the second pose, a first relative spatial movement of the see-through display with respect to the first coordinate system and a second relative spatial movement of the see-through display with respect to the second coordinate system; generate the frame by adjusting a first position of the pixels in the first group displayed at the first time to at least partially compensate for the first relative spatial movement and adjusting a second position of the pixels in the second group displayed at the second time to at least partially compensate for the second relative spatial movement, thereby at least reducing the rolling display effect; and display the frame on the see-through display.

In some cases, the first relative spatial movement of the see-through display with respect to the first coordinate system and the second relative spatial movement of the see-through display with respect to the second coordinate system are not identical and therefore the adjusting of the first position and the adjusting of the second position are not identical.

In some cases, the first group of the pixels is arranged in a plurality of first pixel rows of the pixel rows and the second group of the pixels is arranged in a plurality of second pixel rows of the pixel rows, other than the first pixel rows and wherein the determine and the adjusting are performed for each succeeding pixel row of the pixel rows, succeeding the reference pixel row, wherein the second pose for each succeeding pixel row is determined based on the time difference between displaying the reference pixel row and displaying the corresponding succeeding pixel row.

In some cases, the first group of the pixels is arranged in a plurality of first pixel rows of the pixel rows and the second group of the pixels is arranged in a plurality of second pixel rows of the pixel rows, other than the first pixel rows and wherein the determine and the adjusting are performed for a plurality of groups of succeeding pixel rows of the pixel rows, succeeding the reference pixel row, wherein the second pose for each succeeding groups of succeeding pixel rows is determined based on the time difference between displaying the reference pixel row and displaying the corresponding succeeding group of succeeding pixel rows.

In some cases, the system further comprises at least (a) a first buffer containing the first group of the pixels and (b) a second buffer containing the second group of the pixels, and the adjusting is performed on the first group of the pixels within the first buffer and on the second group of the pixels within the second buffer and wherein the generate includes applying a first correction on the first group of the pixels in the first buffer and a second correction on the second group of the pixels in the second buffer.

In some cases, the adjusting is performed when the first relative spatial movement or the second relative spatial movement exceeds a threshold.

In some cases, the first pose is a current pose of the see-through display.

In some cases, the system further comprises a projector, and the displaying of the given pixel row is performed by the projector.

In some cases, an image source of the projector is an Organic Light Emitting Diode (OLED) image source.

In some cases, the system further comprises one or more pose sensors configured to obtain information enabling determination of the second pose of the see-through display by tracking the see-through display's pose relative to a fixed coordinate system established in space, and the second pose is determined based on the information.

In some cases, the pose sensors include at least one of the following: (a) an inertial measurement unit; (b) a magnetic tracker; or (c) an optical tracker.

In some cases, the frame is obtained from a frame source.

In some cases, the frame source is a night vision camera.

In some cases, the night vision camera is connected to a helmet worn by a user.

In some cases, the user is an operator of a moving platform.

In some cases, the pose is relative to the moving platform and to a fixed coordinate system established in space.

In some cases, at least one of the first symbol and the second symbol is a computer-generated symbol.

In some cases, the see-through display is a visor of a helmet worn by a user.

In some cases, the user is an operator of a moving platform.

In some cases, the first coordinate system is a coordinate system of the moving platform.

In some cases, the first coordinate system is a coordinate system of a moving platform and the second coordinate system is earth coordinate system.

In some cases, the system is a head-worn system.

In some cases, the second time is a future time and the second pose is a predicted pose of said see-through display at the future time.

In accordance with a second aspect of the presently disclosed subject matter, there is provided a method for generating a frame for display on a see-through display, the frame comprising a plurality of pixels arranged in a plurality of pixel rows, wherein at least a first group of the pixels represents a first element displayed relative to a first coordinate system and a second group of the pixels represents a second element displayed relative to a second coordinate system other than the first coordinate system, wherein a time difference exists between a first time of displaying a reference pixel row of the pixel rows and a second time of displaying a given pixel row of the pixel rows, wherein the given pixel row is any pixel row of the pixel rows subsequent to the reference pixel row, and wherein a first pose of the see-through display at the first time is different than a second pose of said see-through display at the second time, thereby causing a rolling display effect, the method comprising: determining, by a processing resource, using first information of the first pose and second information of the second pose, a first relative spatial movement of the see-through display with respect to the first coordinate system and a second relative spatial movement of the see-through display with respect to the second coordinate system; generating, by the processing unit, the frame by adjusting a first position of the pixels in the first group displayed at the first time to at least partially compensate for the first relative spatial movement and adjusting a second position of the pixels in the second group displayed at the second time to at least partially compensate for the second relative spatial movement, thereby at least reducing the rolling display effect; and displaying the frame on the see-through display.

In some cases, the first relative spatial movement of the see-through display with respect to the first coordinate system and the second relative spatial movement of the see-through display with respect to the second coordinate system are not identical and therefore the adjusting of the first position and the adjusting of the second position are not identical.

In some cases, the first group of the pixels is arranged in a plurality of first pixel rows of the pixel rows and the second group of the pixels is arranged in a plurality of second pixel rows of the pixel rows, other than the first pixel rows and wherein the determine and the adjusting are performed for each succeeding pixel row of the pixel rows, succeeding the reference pixel row, wherein the second pose for each succeeding pixel row is determined based on the time difference between displaying the reference pixel row and displaying the corresponding succeeding pixel row.

In some cases, the first group of the pixels is arranged in a plurality of first pixel rows of the pixel rows and the second group of the pixels is arranged in a plurality of second pixel rows of the pixel rows, other than the first pixel rows and wherein the determining and the adjusting are performed for a plurality of groups of succeeding pixel rows of the pixel rows, succeeding the reference pixel row, wherein the second pose for each succeeding groups of succeeding pixel rows is determined based on the time difference between displaying the reference pixel row and displaying the corresponding succeeding group of succeeding pixel rows.

In some cases, the adjusting is performed (a) on the first group of the pixels within a first buffer containing the first group of the pixels and (b) on the second group of the pixels within a second buffer containing the second group of the pixels; and wherein the generating includes applying a first correction on the first group of the pixels in the first buffer and a second correction on the second group of the pixels in the second buffer.

In some cases, the adjusting is performed when the first relative spatial movement or the second relative spatial movement exceeds a threshold.

In some cases, the first pose is a current pose of the see-through display.

In some cases, the displaying of the given pixel row is performed by a projector.

In some cases, an image source of the projector is an Organic Light Emitting Diode (OLED) image source.

In some cases, the second pose is determined based on information obtained by one or more pose sensors configured to obtain the information by tracking the see-through display's pose relative to a fixed coordinate system established in space.

In some cases, the pose sensors include at least one of the following: (a) an inertial measurement unit; (b) a magnetic tracker; or (c) an optical tracker.

In some cases, the frame is obtained from a frame source.

In some cases, the frame source is a night vision camera.

In some cases, the night vision camera is connected to a helmet worn by a user.

In some cases, the user is an operator of a moving platform.

In some cases, the pose is relative to the moving platform and to a fixed coordinate system established in space.

In some cases, at least one of the first symbol and the second symbol is a computer-generated symbol.

In some cases, the see-through display is a visor of a helmet worn by a user.

In some cases, the user is an operator of a moving platform.

In some cases, the first coordinate system is a coordinate system of the moving platform.

In some cases, the first coordinate system is a coordinate system of a moving platform and the second coordinate system is earth coordinate system.

In some cases, the method is performed on a head-worn system.

In some cases, the second time is a future time and the second pose is a predicted pose of said see-through display at the future time.

In accordance with a third aspect of the presently disclosed subject matter, there is provided a non-transitory computer readable storage medium having computer readable program code embodied therewith, the computer readable program code, executable by at least one processor to perform a method for generating a frame for display on a see-through display, the frame comprising a plurality of pixels arranged in a plurality of pixel rows, wherein at least a first group of the pixels represents a first element displayed relative to a first coordinate system and a second group of the pixels represents a second element displayed relative to a second coordinate system other than the first coordinate system, wherein a time difference exists between a first time of displaying a reference pixel row of the pixel rows and a second time of displaying a given pixel row of the pixel rows, wherein the given pixel row is any pixel row of the pixel rows subsequent to the reference pixel row, and wherein a first pose of the see-through display at the first time is different than a second pose of said see-through display at the second time, thereby causing a rolling display effect, the method comprising: determining, by a processing resource, using first information of the first pose and second information of the second pose, a first relative spatial movement of the see-through display with respect to the first coordinate system and a second relative spatial movement of the see-through display with respect to the second coordinate system; generating, by the processing unit, the frame by adjusting a first position of the pixels in the first group displayed at the first time to at least partially compensate for the first relative spatial movement and adjusting a second position of the pixels in the second group displayed at the second time to at least partially compensate for the second relative spatial movement, thereby at least reducing the rolling display effect; and displaying the frame on the see-through display.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which:

FIG. 1A is an illustration of a desired display of a frame comprising a single line, comprised of five vertical pixels, overlaying a corresponding real-world vertical line seen through a see-through display, in accordance with the prior art;

FIG. 1B is an illustration of the rolling display effect occurring upon a change of a see-through display's pose relative to the real-world visible therethrough, while a given frame is being projected by a pixel projection mechanism, in accordance with the prior art;

FIG. 1C is another illustration of the rolling display effect occurring upon a change of a see-through display's pose relative to the real-world visible therethrough, while a given frame is being projected by a pixel projection mechanism, in accordance with the prior art;

DETAILED DESCRIPTION

Figure 2:
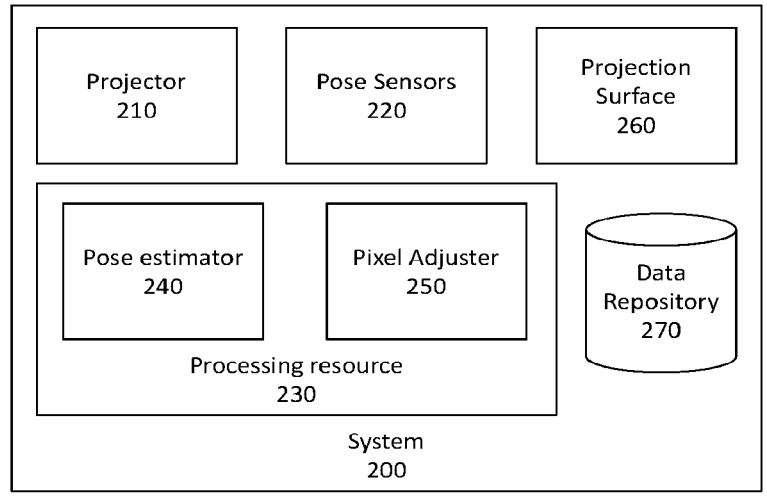
FIG. 2 is a block diagram schematically illustrating one example of a system for correcting a rolling display effect, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "obtaining", "adjusting", "displaying", "receiving", "determining" or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 3:
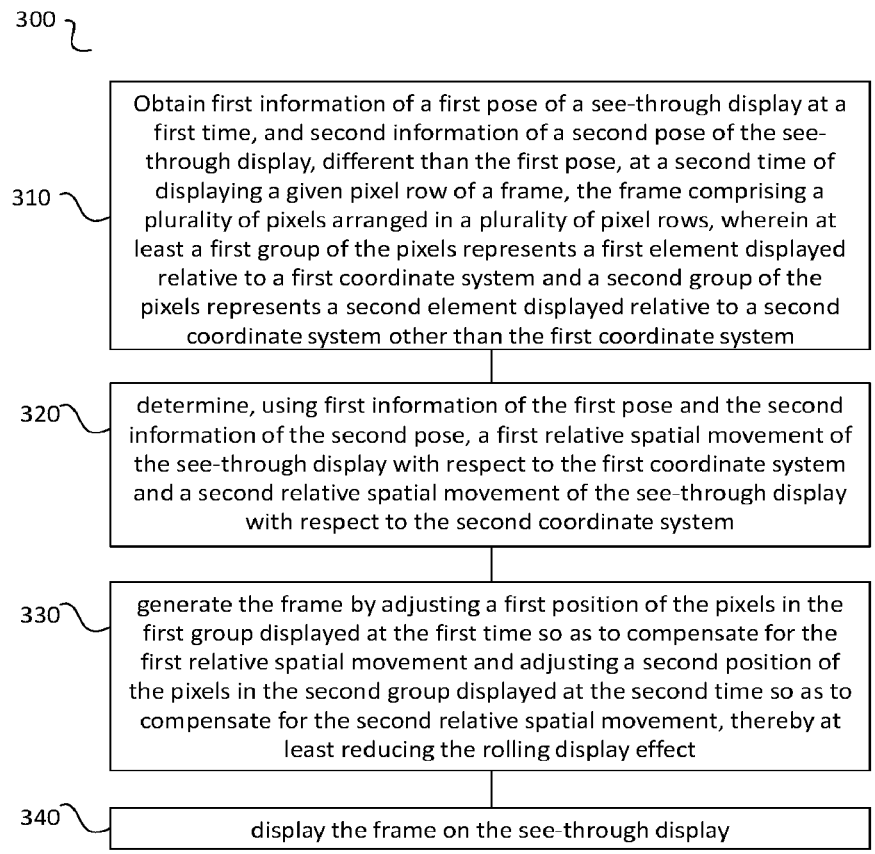
FIG. 3 is a flowchart illustrating one example of a sequence of operations carried out for correcting a rolling display effect, in accordance with the presently disclosed subject matter.

In embodiments of the presently disclosed subject matter, fewer, more and/or different stages than those shown in FIG. 3 may be executed. In embodiments of the presently disclosed subject matter one or more stages illustrated in FIG. 3 may be executed in a different order and/or one or more groups of stages may be executed simultaneously. FIG. 2 illustrate a general schematic of the system architecture in accordance with an embodiment of the presently disclosed subject matter. Each module in FIG. 2 can be made up of any combination of software, hardware and/or firmware that performs the functions as defined and explained herein. The modules in FIG. 2 may be centralized in one location or dispersed over more than one location. In other embodiments of the presently disclosed subject matter, the system may comprise fewer, more, and/or different modules than those shown in FIG. 2.

My reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 2, a block diagram schematically illustrating one example of a system for correcting a rolling display effect, in accordance with the presently disclosed subject matter.

According to certain examples of the presently disclosed subject matter, system 200 can comprise a projection surface 260 and a projector 210. The projector 210 is configured to project frames comprised of a plurality of pixels on the projection surface 260, where not all pixels are projected on the projection surface 260 simultaneously. The projector 210 projects the frames pixel-by-pixel, pixel-row by pixel-row, or in any other manner, in which for at least a given pair of pixels, there is a time difference between the projector 210 projecting the first pixel of the pair and the second pixel of the pair on the projection surface 260. In some cases, at least a first group of the pixels represents a first element displayed relative to a first coordinate system and a second group of the pixels represents a second element displayed relative to a second coordinate system other than the first coordinate system.

It is to be noted that when reference is made herein to a frame, it does not necessarily cover the entire projection surface 260 or the entire display area, and it can optionally cover only parts thereof.

In some cases, the projection surface 260, on which the projector 210 projects the frames, is a reflective or semi reflective surface designed to reflect the pixels into the eyes of a user viewing the surface. In more specific cases, the projection surface 260 is a see-through display, being a transparent surface, such as a visor of a helmet (or any other head worn system) worn by a user (e.g. a pilot of an aircraft or any other operator of a stationary or moving platform), treated with a semi-reflective treatment making it a combiner, as is known in the art.

It is an objective of the presently disclosed subject matter to reduce, or prevent, distortion of elements (also referred to herein, interchangeably as "objects", where the elements/objects can be, for example, images, videos, text, symbols, or any other type of data that can be displayed on the see-through display) projected by the projector 210, in those cases where the pose of the projection surface 260 on which such elements are projected changes over time during the projection thereof, due to the rolling display effect. This will enable maintaining a certain relationship between one or more elements (comprised within a frame) projected by the projector 210 on the projection surface 260 and one or more corresponding objects that may be fixed to a coordinate system other than the coordinate system of the projection surface 260 (e.g. earth coordinate system, moving platform coordinate system, etc.), while reducing, or eliminating, the rolling display effect described above (caused inter alia due to changes of the projection surface's 260 pose).

In some cases, projector 210 may comprise an image source such as an Organic Light Emitting Diode.

System 200 further comprises one or more pose sensors 220 configured to obtain information enabling a pose estimator 240 to determine a predicted pose of the projection surface 260 relative to at least one coordinate system established in space (e.g. earth coordinates), and in some cases, at least two different coordinate systems (e.g. earth coordinate system and moving platform's coordinate system), at various future points-in-time. The pose sensors 220 can include one or more of the following: one or more inertial sensors (e.g. inertial measurement units), one or more magnetic sensors (e.g. magnetic tracker), one or more optical sensors (e.g. an optical tracker). It is to be noted that any other sensor, or combination of sensors, can be used, mutatis mutandis, as long as the information obtained thereby enables a pose estimator 240 to determine a predicted pose of the projection surface 260 relative to a fixed coordinate system established in space (e.g. earth coordinates), and in some cases, at least two different coordinate systems (e.g. earth coordinate system and moving platform's coordinate system), at various future points-in-time.

It is to be noted that in some cases, e.g. when it is desirable to determine a predicted pose of the projection surface 260 relative to two different coordinate systems (e.g. earth coordinate system and moving platform's coordinate system), at least two pose sensors 220 may be required. In an example where the projection surface 260 is located within a moving platform, one pose sensor 220 can be obtain information of pose changes of the projection surface 260, and another pose sensor can obtain information of pose changes of the moving platform. In such cases, in order to determine a predicted pose of the projection surface 260 relative a fixed coordinate system established in space (e.g. earth coordinates), pose estimator 240 is required to obtain information from the pose sensors 220 associated with the projection surface 260, as well as information from pose sensors associated with the moving platform. The pose estimator 240 integrates the information from both data sources in order to determine a predicted pose of the projection surface 260 relative to a fixed coordinate system established in space (e.g. earth coordinates).

System 200 can further comprise a data repository 270 (e.g. a database, a storage system, a memory including Read Only Memory—ROM, Random Access Memory—RAM, or any other type of memory, etc.) configured to store data, including, inter alia, frames (or parts thereof) for display, elements (such as symbols) to overlay, etc.

System 200 further comprises a processing resource 230. The processing resource 230 can include one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant system 200 resources and for enabling operations related to system's 200 resources (e.g. projecting frames, adjusting pixels, etc.).

The processing resource 230 can comprise one or more of the following modules: pose estimator 240 and pixel adjuster 250.

According to some examples of the presently disclosed subject matter, pose estimator 240 is configured to obtain information from the pose sensors 220, and determine, based on the obtained information, a predicted pose of the projection surface 260, relative to one or more coordinate systems established in space (e.g. earth coordinates), and in some cases, relative to at least two different coordinate systems (e.g. earth coordinate system and moving platform's coordinate system), at a future time (it is to be noted that when reference is made to the pose of the projection surface 260 throughout the description, it refers to a pose thereof relative to a corresponding coordinate system (e.g. earth coordinates, or moving platform coordinates)). Pose estimator 240 can determine the predicted pose using various methods and/or techniques, known and/or proprietary.

Pixel adjuster 250 is configured to adjust the position of one or more pixels/pixel rows of a given frame, so as to align the pixel/pixel row with the predicted pose (assuming that the predicted pose is different than the current pose when projecting the pixel/pixel row), thereby at least reducing, if not eliminating, a rolling display effect, as further detailed herein, inter alia with reference to FIG. 3. It is to be noted that adjustment of the position can be performed by moving the pixels within their respective pixel rows or by moving the pixel rows altogether.

In some cases, a first group of the pixels of the given frame represents a first element displayed relative to a first coordinate system, and a second group of the pixels (other than the first group) of the given frame represents a second element displayed relative to a second coordinate system other than the first coordinate system. In such cases, the pixel adjuster 250 can be configured to adjust a first position of the pixels in the first group so as to compensate for the first relative spatial movement and adjusting a second position of the pixels in the second group so as to compensate for the second relative spatial movement, as further detailed herein, inter alia with reference to FIG. 3.

It is to be noted that the projector 210 and the projection surface 260 can have a fixed spatial relationship, e.g. in case both are fixed on a common object such as a helmet (or any other head worn system) of the user. However, in other cases, when the projector 210 and the projection surface 260 do not have a fixed spatial relationship, information of the relative movement between the projector 210 and the projection surface 260 is also required in order to adjust the pixels/pixel rows position within the frame.

It is to be noted that in some cases, the system 200 can be integrated with a Head Mounted Device (e.g. a helmet) of a user thereof, while the helmet can comprise all, or part of the system 200 components, while in some cases, parts of the system 200 may be external thereto.

Turning to FIG. 3, there is shown a flowchart illustrating one example of a sequence of operations carried out for correcting a rolling display effect, in accordance with the presently disclosed subject matter.

According to some examples of the presently disclosed subject matter, system 200 can be configured to perform a pixel adjustment process 300, e.g. utilizing the pixel adjuster 250. The pixel adjustment process 300 can be performed while the projector 210 projects a frame, comprising a plurality of pixels arranged in a plurality of pixel rows, on the projection surface 260. In some cases, at least a first group of the pixels represents a first element displayed relative to a first coordinate system and a second group of the pixels represents a second element displayed relative to a second coordinate system other than the first coordinate system.

The pixel adjustment process 300 is required in those cases where: (a) a time difference exists between a first time of displaying a reference pixel row (that can be the first pixel row) of the pixel rows and a second time of displaying a given pixel row of the pixel rows, wherein the given pixel row is any pixel row of the pixel rows subsequent to the reference pixel row, and (b) a pose of the projection surface 260 at the first time is different than a predicted pose of the projection surface 260 at the second time, relative to at least one of the first coordinate system or the second coordinate system (and, if there are more than two elements to be displayed relative to more than two respective coordinate systems, any pose difference relative to any one of the coordinate systems).

In such cases, pixel adjuster 250 can be configured to perform the pixel adjustment process 300, being an intra-frame process, during which a frame is generated and for display on the projection surface 260 (e.g. a see-through display). The generated frame comprises a plurality of pixels arranged in a plurality of pixel rows, wherein at least a first group of the pixels represents a first element displayed relative to a first coordinate system (e.g. earth coordinate system) and a second group of the pixels represents a second element displayed relative to a second coordinate system (e.g. moving platform coordinate system) other than the first coordinate system. In some cases (a) a time difference exists between a first time during which a reference pixel row (that can optionally be the first pixel row) of the pixel rows is displayed, or is expected to be displayed, and a second time during which a given pixel row of the pixel rows, being any pixel row of the pixel rows subsequent to the reference pixel row is displayed, or is expected to be displayed, and (b) a first pose of the projection surface 260 at the first time is different than a second pose of said projection surface 260 at the second time, thereby causing a rolling display effect.

In order to prevent, or at least reduce, the rolling display effect, the pixel adjustment process 300 includes obtaining information of the first pose of a projection surface 260 at the first time, and information of the second pose of the projection surface 260 at the second time (block 310). The information of the first pose can be determined using information gathered by a pose sensor 220 that provides information of pose changes of the projection surface 260, and the information of the second pose can be determined using information gathered by another pose sensor 220 that provides information of pose changes of the moving platform. It is to be noted that the first pose can be a current pose of the projection surface 260, or a predicted pose thereof. It is to be further noted that the second pose can be a predicted pose of the projection surface 260, at a future time.

The obtained information of the first pose and second pose can be with respect to multiple coordinate systems, such as the first coordinate system (e.g. earth coordinate system) and the second coordinate system (e.g. moving platform coordinate system).

The pixel adjustment process 300 further includes determining, using the information of the first pose and the second pose, (a) a relative spatial movement of the projection surface 260 with respect to the first coordinate system, and (b) a second relative spatial movement of the projection surface 260 with respect to the second coordinate system (block 320).

Pixel adjustment process 300 can be configured to generate the frame by adjusting a first position of the pixels in the first group displayed at the first time to at least partially compensate for the first relative spatial movement and adjusting a second position of the pixels in the second group displayed at the second time to at least partially compensate for the second relative spatial, movement, and thereby at least reducing the rolling display effect (block 330).

Figure 4:
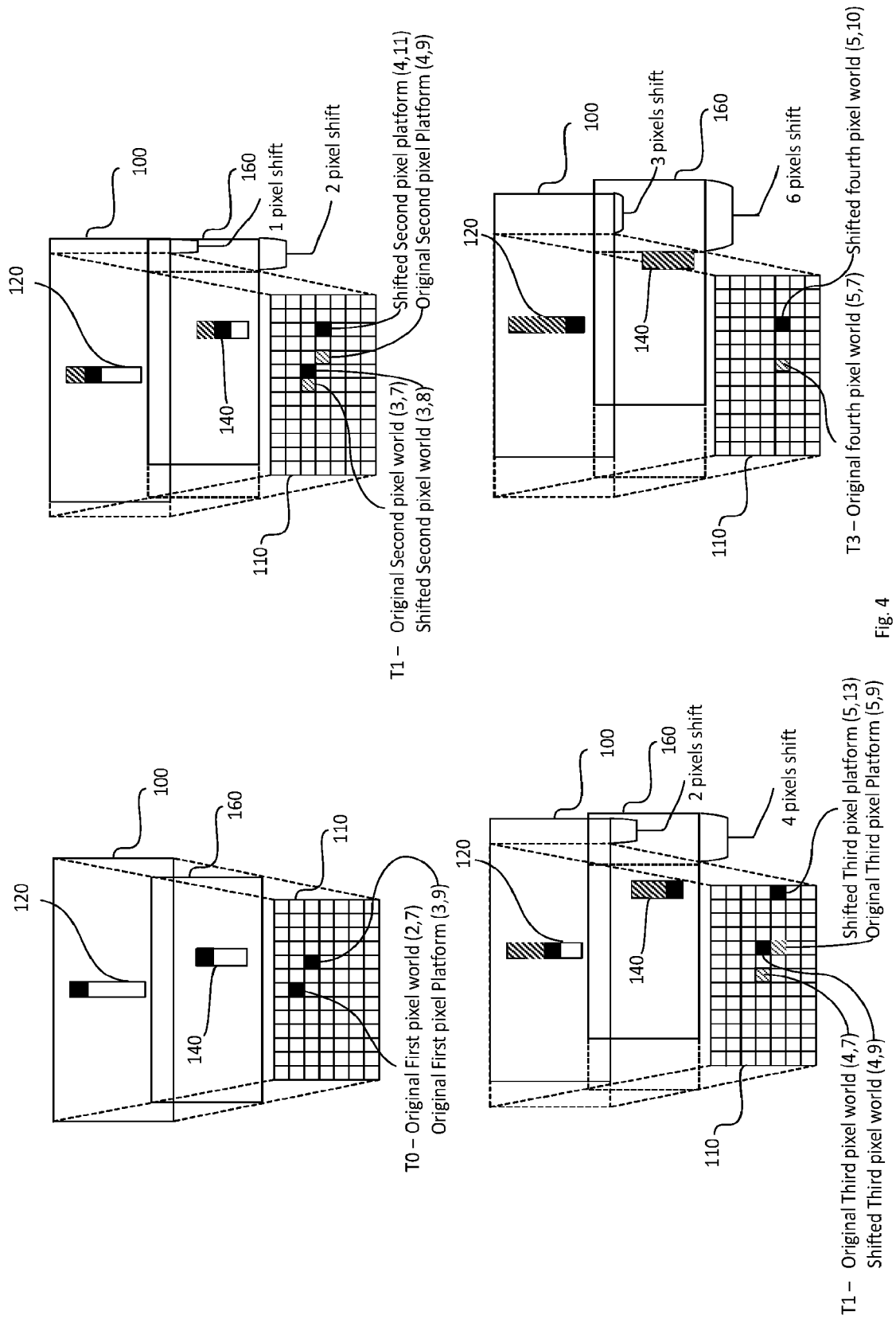
FIG. 4 is an illustration of the correction of the rolling display effect, in accordance with the presently disclosed subject matter.

It is to be noted, in this respect, that the relative spatial movement of the see-through display with respect to the first coordinate system and the relative spatial movement of the see-through display with respect to the second coordinate system are not identical and therefore the adjusting of the first position and the adjusting of the second position are not identical, as will be further exemplified with reference to FIG. 4.

In some cases, the first group of the pixels can be arranged in a plurality of first pixel rows of the pixel rows (e.g. the even numbered rows) while the second group of the pixels is arranged in a plurality of second pixel rows of the pixel rows (e.g. odd numbered rows), other than the first pixel rows.

In such cases, the determine of block 320 and the adjusting of block 330 can be performed for each succeeding pixel row of the pixel rows, succeeding the reference pixel row (or only to at least part, or all, of those succeeding pixel rows that include at least one pixel of the first group or the second group), while the second pose for each such succeeding pixel row used at block 320 is determined based on the time difference between displaying the first pixel row and displaying the corresponding succeeding pixel row. This means that if a given number of pixel rows exists, the determine of block 320 and the adjusting of block 330 will be performed for each of the pixel rows, and in those cases where there is a predicted pose difference between the corresponding row and the reference pixel row, the position of the pixels, if required, will be adjusted as detailed above.

In some cases, the determine of block 320 and the adjusting of block 330 will only be performed for those pixel rows for which the difference between a pose of the projection surface 260 at the first time and a predicted pose of the projection surface 260 at the second time is larger than a given threshold (e.g. only in case the pose difference is likely to cause a rolling display effect that can be detected by the human eyes, or only in those cases where the pose difference is likely to cause spatial orientation difficulties for a pilot viewing the projection surface 260, etc.).

Alternatively, the determine of block 320 and the adjusting of block 330 can be performed for a plurality of groups of succeeding pixel rows of the pixel rows (instead of separately for each pixel row), succeeding the reference pixel row, while the second pose for each succeeding groups of succeeding pixel rows is determined based on the time difference between displaying the reference pixel row and displaying the corresponding succeeding group of succeeding pixel rows.

In accordance with another example, the system 200 can further comprise, e.g. in the data repository 270, at least (a) a first buffer containing the first group of the pixels and (b) a second buffer containing the second group of the pixels. In such cases, the adjusting of block 330 can be performed on the first group of the pixels within the first buffer and on the second group of the pixels within the second buffer, by applying a first correction on the first group of the pixels in the first buffer and a second correction on the second group of the pixels in the second buffer. The information within first buffer and the information within the second buffer (and optionally additional buffers) can then be combined to give rise to the generated frame.

Pixel adjustment process 300 can be configured to display (e.g. using the projector 210) the generated frame on the see-through display (block 340).

In some cases, the frame to be displayed at block 340 is received by the image source from a frame source such as a camera. In more particular cases, the camera can be, for example, an IR camera, a visible light camera, a night vision camera and the like. The frame may be a frame of synthetic/virtual data retrieved from data repository 270 for the purpose of display thereof on the projection surface 260. The frames delivered to the image source can be light intensified (FLIR (forward looking infrared) image, an ICCD (intensified charge coupled device) image, a night vision image, etc.), infrared images, or otherwise images not normally visible to the human eye. In some cases. The image source and/or the projector 210 and/or the projection surface 260 can have a fixed spatial relationship, e.g. in case corresponding two or more of them are fixed on a common object such as a helmet (or any other head worn system) of the user. In other cases, the frame source can be connected to the platform operated by the user viewing the projection surface 260.

In additional/alternative cases, the frame to be displayed on the projection surface 260, or at least part of the elements comprised therein (e.g. a level indicator, a target marker, a crosshair, etc.), can be computer-generated.

It is to be noted that, with reference to FIG. 3, some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

FIG. 4 is an illustration of the correction of the rolling display effect, in accordance with the presently disclosed subject matter.

In the illustrated example, the see-through display's 110 movement relative to the first coordinate system (e.g. earth coordinate system) results in a shift of the see-through display 110, equivalent to one pixel to the left-hand side, during presentation of each pixel row, whereas the see-through display's 110 movement relative to the second coordinate system (e.g. moving platform coordinate system) results in a shift of the see-through display 110, equivalent to two pixel to the left-hand side, during presentation of each pixel row, as described with respect to FIG. 1B.

However, in the illustrated example, the system 200 executes the pixel adjustment process 300 to compensate for such shift, so that the first projected vertical line 130 and the second projected vertical line 150, projected by the projector 210, are perceived as intended by the user, viewing the see-through display 110 (i.e. as aligned with the first vertical line 120 (being a certain object within the real-world) and with the second vertical line 140 (being an object within the moving platform), respectively).

In the illustrated example, the first projected vertical line 130 is required to be aligned with the first vertical line 120, and the second projected vertical line 150 is required to be aligned with the second vertical line 140. It is to be noted that the distortion of the first projected vertical line 130 and of the second projected vertical line 150 will occur irrespective of their relationship with the first vertical line 120 and with the second vertical line 140, respectively, in those cases where the pose of the see-through display 110 on which the first projected vertical line 130 and the second projected vertical line 150 are projected changes over time during the projection thereof. Reference is made herein to the first vertical line 120 and to the second vertical line 140 for ease of understanding only, and it is by no means binding.

More specifically, at T0, being the time the projector 210 projected the first pixel of the first projected vertical line 130 and of the second projected vertical line 150 on the see-through display 110 (i.e. the pixel located at the second row, seventh column (denoted "original first pixel world") and the pixel located at the third row, ninth column (denoted "original first pixel platform") in the seven by thirteen matrix of pixels projectable by the projector 210), the first pixel of the first projected vertical line 130 is aligned with the first vertical line 120 and the first pixel of the second projected vertical line 150 is aligned with the second vertical line 140, and no compensation is required. It is to be noted that in some cases (not shown), also the first pixel is shifted and the pixel adjustment process 300 can compensate also for the first pixel shifting.

At T1 (being the time the projector 210 projected the second pixel of the first projected vertical line 130, and the second pixel of the second projected vertical line 150 on the see-through display 110), the see-through display's 110 pose changed, so that (a) the second pixel of the first projected vertical line 130 originally located at the third row, seventh column, is no longer aligned with the first vertical line 120, as it is shifted one pixel distance to the left-hand side with respect to the first vertical line 120, and (b) the second pixel of the second projected vertical line 150 originally located at the fourth row, ninth column, is no longer aligned with the second vertical line 140, as it is shifted two pixel distance to the left-hand side with respect to the first vertical line 120. There is therefore a need to shift (a) the second pixel of the first projected vertical line 130 a distance of one pixel to the right, so that after the shifting the second pixel of the first projected vertical line 130 is located at the third row, eighth column, and (b) the second pixel of the second projected vertical line 150 a distance of two pixels to the right, so that after the shifting the second pixel of the second projected vertical line 150 is located at the fourth row, eleventh column. Such shifting results in the shifted second pixel of the first projected vertical line 130 being aligned with the first vertical line 120 and in the shifted second pixel of the second projected vertical line 150 being aligned with the second vertical line 140.

At T2 (being the time the projector 210 projected the third pixel of the first projected vertical line 130, and the third pixel of the second projected vertical line 150 on the see-through display 110), the see-through display's 110 pose changed further, so that (a) the third pixel of the first projected vertical line 130 originally located at the fourth row, seventh column, is no longer aligned with the first vertical line 120, as it is shifted two pixels distance to the left-hand side with respect to the first vertical line 120, and (b) the third pixel of the second projected vertical line 150 originally located at the fifth row, ninth column, is no longer aligned with the second vertical line 140, as it is shifted four pixel distance to the left-hand side with respect to the first vertical line 120. There is therefore a need to shift (a) the third pixel of the first projected vertical line 130 a distance of two pixels to the right, so that after the shifting the third pixel of the first projected vertical line 130 is located at the fourth row, ninth column, and (b) the third pixel of the second projected vertical line 150 a distance of four pixels to the right, so that after the shifting the second pixel of the second projected vertical line 150 is located at the fifth row, thirteenth column. Such shifting results in the shifted third pixel of the first projected vertical line 130 being aligned with the first vertical line 120 and in the shifted third pixel of the second projected vertical line 150 being aligned with the second vertical line 140.

At T3 (being the time the projector 210 projected the fourth pixel of the first projected vertical line 130 on the see-through display 110), the see-through display's 110 pose changed even further, so that the fourth pixel of the first projected vertical line 130 originally located at the fifth row, seventh column, is no longer aligned with the first vertical line 120, as it is shifted three pixels distance to the left-hand side with respect to the first vertical line 120. There is therefore a need to shift the fourth pixel of the first projected vertical line 130 a distance of three pixels to the right, so that after the shifting the fourth pixel of the first projected vertical line 130 is located at the fifth row, tenth column. Such shifting results in the shifted fourth pixel of the first projected vertical line 130 being aligned with the first vertical line 120. It is to be noted that in the illustrated example, the second projected vertical line 150 is comprised of three pixels only, and therefore there is no projection of any pixel of the second projected vertical line 150 at T4.

It is to be noted that although reference is made in the example described herein to shifting of specific pixels, in some cases the entire pixel rows comprising the shifted pixels are shifted.

It is to be further noted that similarly to the example illustrated in FIG. 1B, also in the example illustrated in FIG. 4, the pose changes at a fixed rate, however this is not necessarily so, as the rate can be increased or decreased during projection of the pixels of a given frame. The pose change rate also affects the pixel shifting distance, and the higher the pose change rate is—the larger the pixel shifting distance is, and the larger the shifting for correction of the pixel shifting is required to be. In addition, reference is made to objects in the form of lines, however this is by no means binding and other types of objects are contemplated as well. Still further, the scale of seven by thirteen-pixel matrix projectable by the projector 210 is arbitrarily selected and other scales are contemplated as well.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

What we claim is:

1. A system for displaying, on a see-through display located within a moving platform, a frame comprising a plurality of pixels arranged in a plurality of pixel rows, wherein a time difference exists between a first time of displaying a first pixel row of the pixel rows and a second time of displaying a given pixel row of the pixel rows, wherein the given pixel row is any pixel row of the pixel rows subsequent to the first pixel row, and wherein a pose of the see-through display at the first time is different than the pose of said see through display at the second time, thereby causing a rolling display effect, the system comprising one or more pose sensors tracking the pose of the see-through display and a processor configured to:
   determine, using first information obtained from the pose sensors tracking the see-through display's pose relative to a fixed coordinate system established in space and second information obtained from one or more second pose sensors tracking the pose of the moving platform relative to the fixed coordinate system established in space, a predicted pose of said see through display at the second time;
   adjust a position of the given pixel row within the frame so as to align the given pixel row with the predicted pose, thereby at least reducing the rolling display effect; and
   display the given pixel row of the frame on the see-through display.

2. The system of claim 1, wherein the adjust and the display are performed for each succeeding pixel row of the pixel rows, succeeding the first pixel row, wherein the predicted pose for each succeeding pixel row is determined based on the time difference between displaying the first pixel row and displaying the corresponding succeeding pixel row.

3. The system of claim 1, wherein the adjust and the display are performed for a plurality of groups of succeeding pixel rows of the pixel rows, succeeding the first pixel row, wherein the predicted pose for each succeeding groups of succeeding pixel rows is determined based on the time difference between displaying the first pixel row and displaying the corresponding succeeding group of succeeding pixel rows.

4. The system of claim 1, wherein the adjust is performed on the given pixel row within a buffer comprising the pixel rows prepared to be displayed and wherein the displayed given pixel row is retrieved from the buffer.

5. The system of claim 1, wherein the adjust is performed when the difference between the pose and the predicted pose exceeds a threshold.

6. The system of claim 1, further comprising a projector, wherein the displaying of the given pixel row is performed by the projector.

7. The system of claim 6, wherein an image source of the projector is an Organic Light Emitting Diode (OLED) image source.

8. The system of claim 1, wherein the pose sensors include at least one of the following:
(a) an inertial measurement unit; (b) a magnetic tracker; or (c) an optical tracker.

9. The system of claim 1, wherein the frame is obtained from a frame source.

10. The system of claim 1, wherein the see-through display is a visor of a helmet worn by a user operating the moving platform.

11. A method for displaying, on a see-through display located within a moving platform, a frame comprising a plurality of pixels arranged in a plurality of pixel rows, wherein a time difference exists between a first time of displaying a first pixel row of the pixel rows and a second time of displaying a given pixel row of the pixel rows, wherein the given pixel row is any pixel row of the pixel rows subsequent to the first pixel row, and wherein a pose of the see-through display at the first time is different than the pose of said see through display at the second time, thereby causing a rolling display effect, the method comprising:
determining, using first information obtained from the pose sensors tracking the see-through display's pose relative to a fixed coordinate system established in space and second information obtained from one or more second pose sensors tracking the pose of the moving platform relative to the fixed coordinate system established in space, a predicted pose of said see through display at the second time;
adjusting a position of the given pixel row within the frame so as to align the given pixel row with the predicted pose, thereby at least reducing the rolling display effect; and
displaying the given pixel row of the frame on the see-through display.

12. The method of claim 11, wherein the adjusting and the displaying are performed for each succeeding pixel row of the pixel rows, succeeding the first pixel row, wherein the predicted pose for each succeeding pixel row is determined based on the time difference between displaying the first pixel row and displaying the corresponding succeeding pixel row.

13. The method of claim 11, wherein the adjusting and the displaying are performed for a plurality of groups of succeeding pixel rows of the pixel rows, succeeding the first pixel row, wherein the predicted pose for each succeeding groups of succeeding pixel rows is determined based on the time difference between displaying the first pixel row and displaying the corresponding succeeding group of succeeding pixel rows.

14. The method of claim 11, wherein the adjusting is performed on the given pixel row within a buffer comprising the pixel rows prepared to be displayed and wherein the displayed given pixel row is retrieved from the buffer.

15. The method of claim 11, wherein the adjusting is performed when the difference between the pose and the predicted pose exceeds a threshold.

16. The method of claim 11 wherein the displaying of the given pixel row is performed by a projector.

17. The method of claim 16, wherein an image source of the projector is an Organic Light Emitting Diode (OLED) image source.

18. The method of claim 11, wherein the pose sensors include at least one of the following: (a) an inertial measurement unit; (b) a magnetic tracker; or (c) an optical tracker.

19. The method of claim 11, wherein the see-through display is a visor of a helmet worn by a user operating the moving platform.

20. A non-transitory computer readable storage medium having computer readable program code embodied therewith, the computer readable program code, executable by at least one processor to perform a method for displaying, on a see-through display located within a moving platform, a frame comprising a plurality of pixels arranged in a plurality of pixel rows, wherein a time difference exists between a first time of displaying a first pixel row of the pixel rows and a second time of displaying a given pixel row of the pixel rows, wherein the given pixel row is any pixel row of the pixel rows subsequent to the first pixel row, and wherein a pose of the see-through display at the first time is different than the pose of said see through display at the second time, thereby causing a rolling display effect, the method comprising:
determining, using first information obtained from the pose sensors tracking the see-through display's pose relative to a fixed coordinate system established in space and second information obtained from one or more second pose sensors tracking the pose of the moving platform relative to the fixed coordinate system established in space, a predicted pose of said see through display at the second time;
adjusting a position of the given pixel row within the frame so as to align the given pixel row with the predicted pose, thereby at least reducing the rolling display effect; and
displaying the given pixel row of the frame on the see-through display.

* * * * *